(12) United States Patent
Katrak

(10) Patent No.: US 10,205,392 B1
(45) Date of Patent: Feb. 12, 2019

(54) CONTROL SYSTEM FOR TRANSITIONING A DC-DC VOLTAGE CONVERTER FROM A BUCK OPERATIONAL MODE TO A SAFE OPERATIONAL MODE UTILIZING A TASK DEADLINE MONITORING APPLICATION

(71) Applicant: LG Chem, Ltd., Seoul (KR)

(72) Inventor: Kerfegar K. Katrak, Fenton, MI (US)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/013,238

(22) Filed: Jun. 20, 2018

Related U.S. Application Data

(60) Provisional application No. 62/539,215, filed on Jul. 31, 2017.

(51) Int. Cl.
| | |
|---|---|
| *H02M 3/158* | (2006.01) |
| *H02M 1/088* | (2006.01) |
| *G05F 1/62* | (2006.01) |
| *H02M 3/157* | (2006.01) |
| *H02M 1/36* | (2007.01) |
| *H02M 3/06* | (2006.01) |

(52) U.S. Cl.
CPC ............ *H02M 3/1582* (2013.01); *G05F 1/62* (2013.01); *H02M 1/088* (2013.01); *H02M 1/36* (2013.01); *H02M 3/06* (2013.01); *H02M 3/157* (2013.01)

(58) Field of Classification Search
None
See application file for complete search history.

(56) References Cited

U.S. PATENT DOCUMENTS

| | | | |
|---|---|---|---|
| 7,496,788 B1 | 2/2009 | Alfieri et al. | |
| 2005/0225259 A1* | 10/2005 | Green | H02M 3/1588 315/224 |
| 2011/0110134 A1* | 5/2011 | Gaboury | H02M 1/4225 363/126 |

(Continued)

FOREIGN PATENT DOCUMENTS

| | | |
|---|---|---|
| JP | 201156852 | 3/2011 |
| JP | 2011258032 A | 12/2011 |
| KR | 20160036793 A | 4/2016 |

OTHER PUBLICATIONS

U.S. Appl. No. 15/974,010, filed May 8, 2018 entitled Watchdog Monitoring System That Utilizes a Disable Application to Monitor Operation of an Enable Application.

(Continued)

*Primary Examiner* — Jeffrey A Gblende
(74) *Attorney, Agent, or Firm* — Buckert Patent & Trademark Law Firm PC; John F. Buckert

(57) ABSTRACT

A control system for transitioning a DC-DC voltage converter from a buck operational mode to a safe operational mode is provided. A microcontroller performs a first scheduled task including executing first and second applications. The task deadline monitoring application sets a task deadline flag to a first fault value when a time interval associated with performing the first scheduled task is greater than a threshold time interval. The hardware abstraction layer inhibits operation of a disable pin of a watchdog IC when the task deadline flag is equal to the first fault value, which induces the watchdog IC to transition the DC-DC voltage converter to the safe operational mode.

15 Claims, 6 Drawing Sheets

(56) References Cited

U.S. PATENT DOCUMENTS

| | | | |
|---|---|---|---|
| 2012/0086416 A1* | 4/2012 | Kudo | H02M 3/1584 |
| | | | 323/265 |
| 2013/0082516 A1* | 4/2013 | Yamaguchi | H02J 4/00 |
| | | | 307/1 |
| 2018/0220502 A1* | 8/2018 | Morales | H05B 33/0815 |

OTHER PUBLICATIONS

U.S. Appl. No. 16/014,104, filed Jun. 21, 2018 entitled Self-Diagnosing Watchdog Monitoring System.

* cited by examiner

CONTROL SYSTEM FOR TRANSITIONING A DC-DC VOLTAGE CONVERTER FROM A BUCK OPERATIONAL MODE TO A SAFE OPERATIONAL MODE UTILIZING A TASK DEADLINE MONITORING APPLICATION

CROSS-REFERENCE TO RELATED APPLICATION

This application claims priority to U.S. Provisional Patent Application No. 62/539,215 filed on Jul. 31, 2017, the entire contents of which are hereby incorporated by reference herein.

BACKGROUND

The inventor herein has recognized a need for an improved control system for transitioning a DC-DC voltage converter from a buck operational mode to a safe operational mode. In particular, the control system utilizes a task deadline monitoring application that determines when a time interval associated with performing a scheduled task is greater than a threshold time interval indicating a fault condition, and if so the control system induces a watchdog integrated circuit to transition the DC-DC voltage converter to the safe operational mode.

SUMMARY

A control system for transitioning a DC-DC voltage converter from a buck operational mode to a safe operational mode in accordance with an exemplary embodiment is provided. The DC-DC voltage converter has a high side integrated circuit with a first plurality of FET switches, and a low side integrated circuit with a second plurality of FET switches therein. The control system includes a watchdog IC having a first disable pin and an internal timer. The control system further includes a microcontroller having a digital input-output device with a second disable pin electrically coupled to the first disable pin. The microprocessor further includes first and second applications, a task deadline monitoring application, and a hardware abstraction layer. The microcontroller performs a first scheduled task including the execution of the first and second applications. The task deadline monitoring application sets a task deadline flag to a first fault value when a time interval associated with performing the first scheduled task is greater than a threshold time interval. The hardware abstraction layer inhibits operation of the second disable pin when the task deadline flag is equal to the first fault value, such that the internal timer continues to increment past a predetermined time which induces the watchdog IC to transition the DC-DC voltage converter to the safe operational mode.

A control system for transitioning a DC-DC voltage converter from a buck operational mode to a safe operational mode in accordance with another exemplary environment is provided. The DC-DC voltage converter has a high side integrated circuit with a first plurality of FET switches, and a low side integrated circuit with a second plurality of FET switches therein. The control system includes a watchdog IC having a first disable pin and an internal timer. The control system further includes a microcontroller having a digital input-output device with a second disable pin electrically coupled to the first disable pin. The microprocessor further includes first and second applications, a program flow monitoring application, and a hardware abstraction layer. The first application sends a first sequence value to the second application. The second application determines a second sequence value based on the first sequence value. The program flow monitoring application sets a flow sequence error flag to a first fault value when a third sequence value based on the second sequence value is not equal to a predetermined sequence value indicating a flow sequence error condition. The hardware abstraction layer inhibits operation of the second disable pin when the flow sequence error flag is equal to the first fault value, such that the internal timer continues to increment past a predetermined time which induces the watchdog IC to transition the DC-DC voltage converter to the safe operational mode.

DETAILED DESCRIPTION

Figure 1:
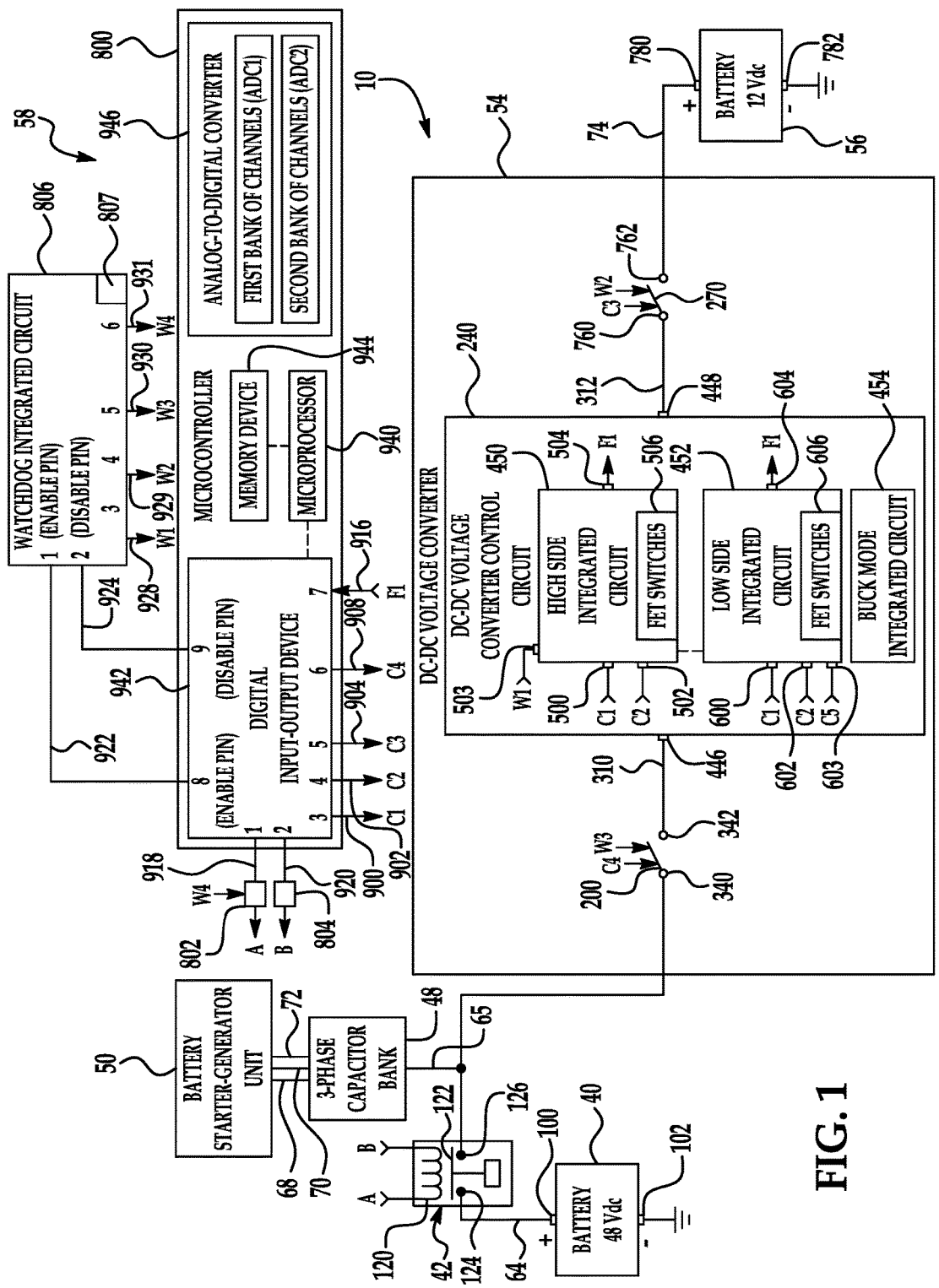
FIG. 1 is a schematic of a vehicle having a control system for a DC-DC voltage converter in accordance with an exemplary embodiment.

Referring to FIG. 1, a vehicle 10 is provided. The vehicle 10 includes a battery 40, a contactor 42, a 3-phase capacitor bank 48, a battery-starter generator unit 50, a DC-DC voltage converter 54, a battery 56, a control system 58, and electrical lines 64, 65, 66, 68, 70, 72, 74.

Figure 3:
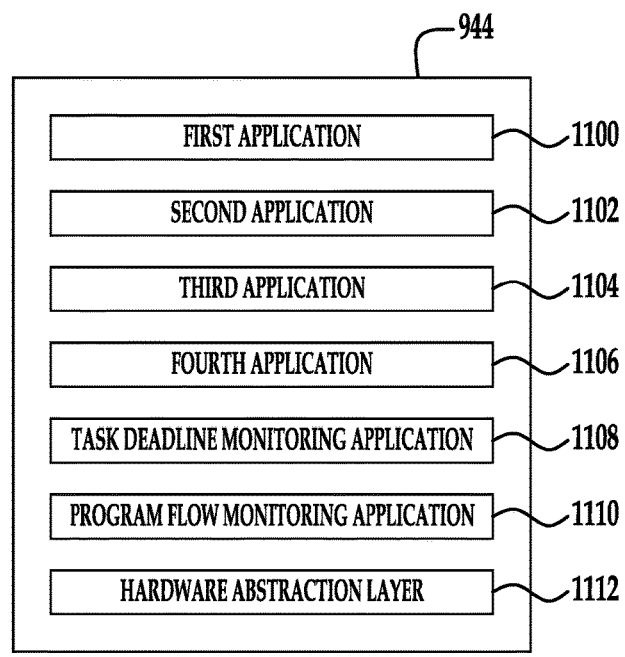
FIG. 3 is a block diagram of first, second, third, and fourth applications, a task deadline monitoring application, a program flow monitoring application, and a hardware abstraction layer utilized by a microcontroller in the control system of FIG. 1.
Figure 4:
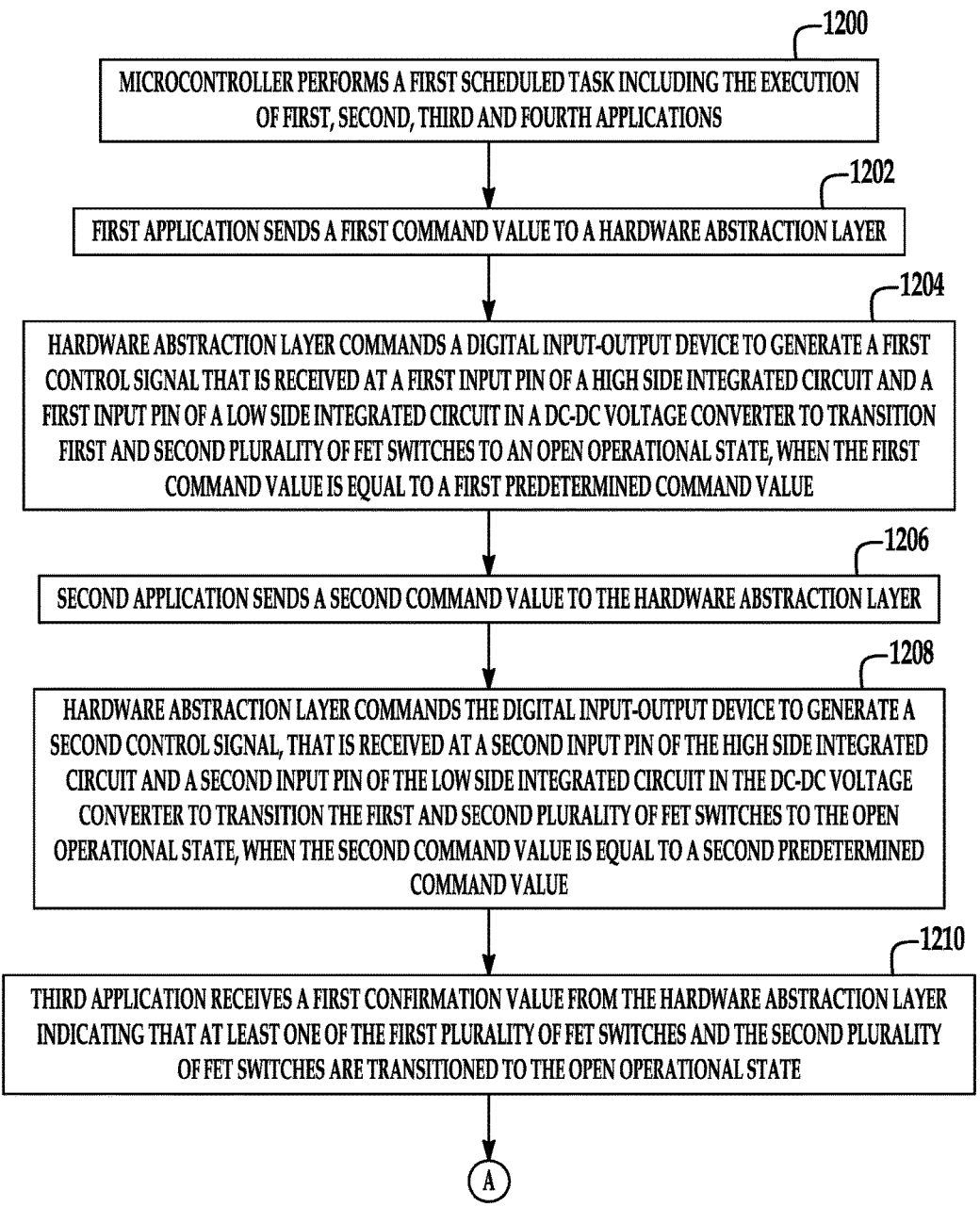
FIGS. 4-5 are a flowchart of a method for transitioning the DC-DC voltage converter from a buck operational mode to a safe operational mode utilizing the task deadline monitoring application in accordance with another exemplary embodiment.
Figure 5:
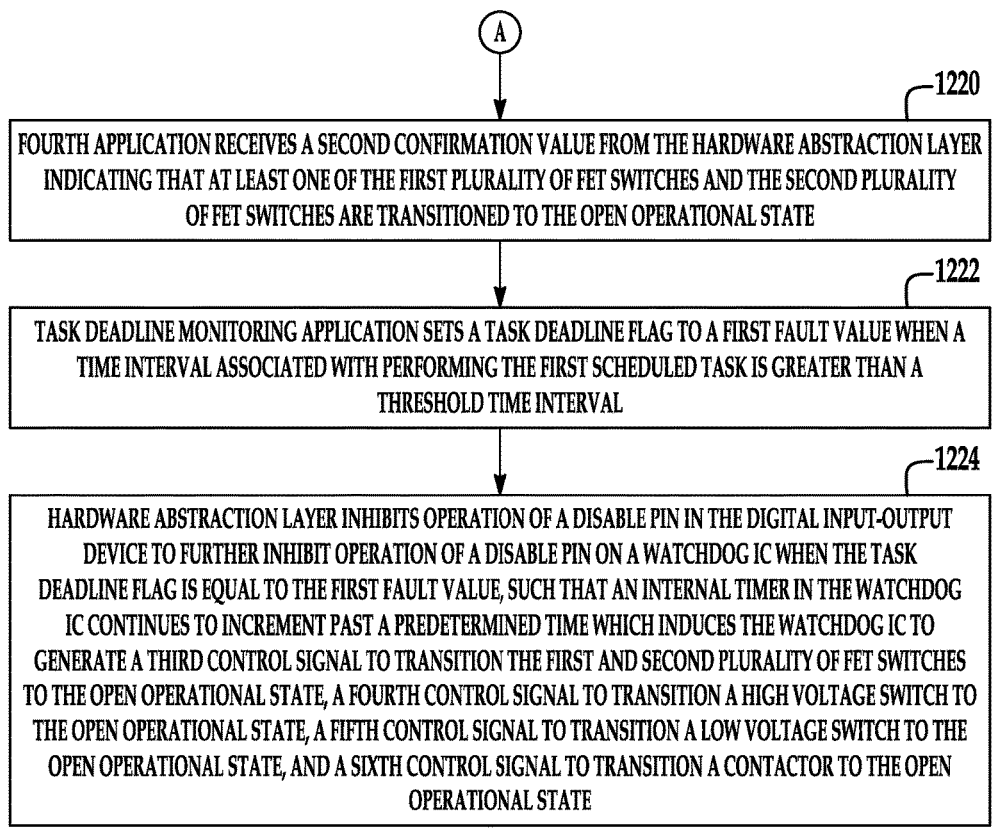
Figure 6:
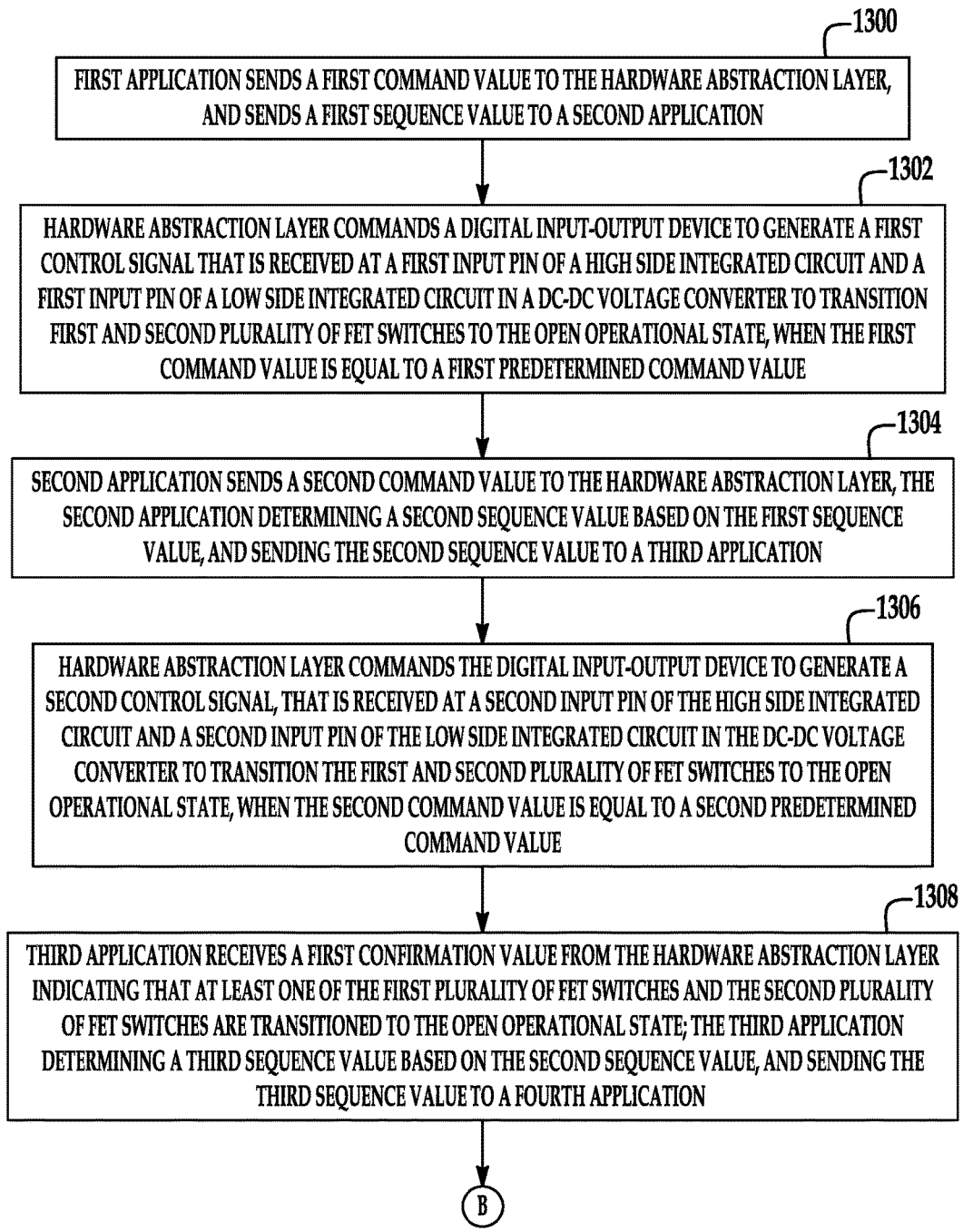
FIGS. 6-7 are a flowchart of a method for transitioning the DC-DC voltage converter from a buck operational mode to a safe operational mode utilizing the program flow monitoring application in accordance with another exemplary embodiment.
Figure 7:
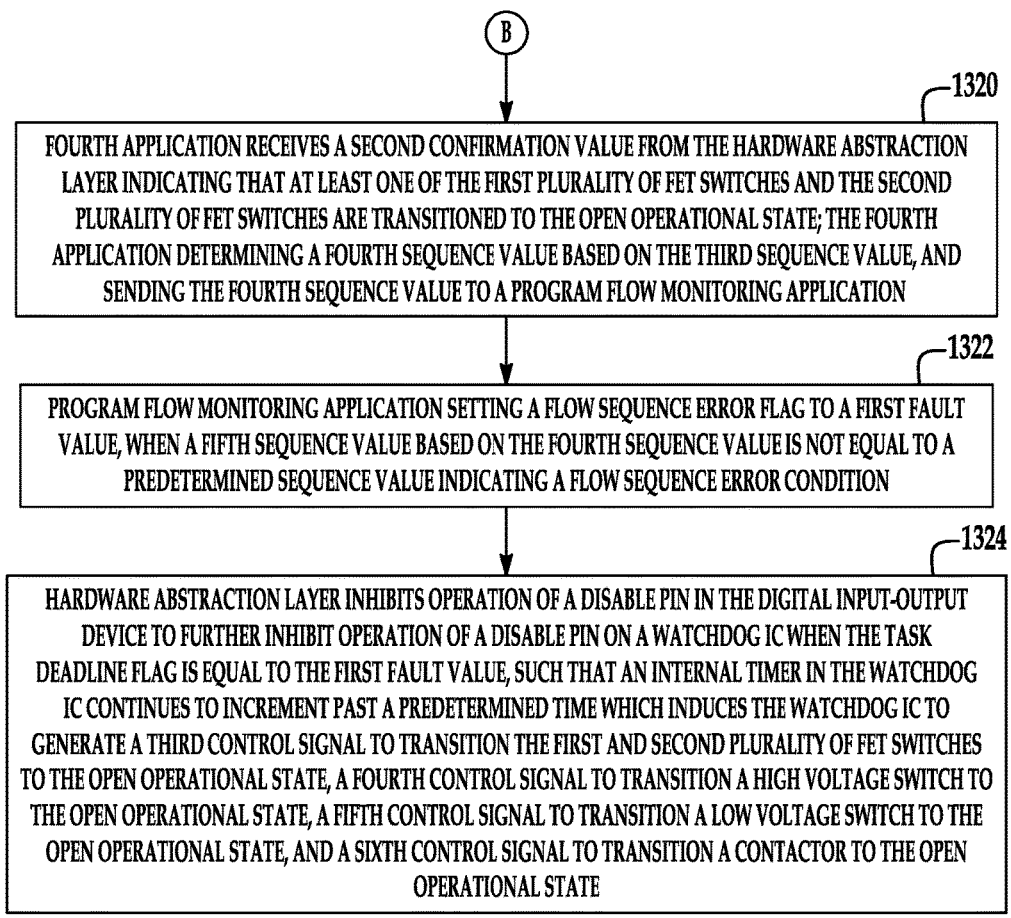

Referring to FIGS. 1 and 3, an advantage of the control system 58 is that the control system 58 utilizes a task deadline monitoring application 1108 that determines when a time interval associated with performing a scheduled task is greater than a threshold time interval indicating a fault condition, and if so the control system induces a watchdog integrated circuit 806 to transition the DC-DC voltage converter 54 to the safe operational mode. Another advantage of the control system 58 is that the control system 58 utilizes a program flow monitoring application 1110 that determines when a flow sequence error condition occurs during execution of at least first and second applications 1100, 1102, and if so the control system 58 induces the watchdog integrated circuit 806 to transition the DC-DC voltage converter 54 to the safe operational mode.

For purposes of understanding, a few terms utilized herein will be described.

The term "node" or "electrical node" is a region or a location in an electrical circuit. A signal can be an electrical voltage, an electrical current, or a binary value.

The term "buck operational mode" is an operational mode of the DC-DC voltage converter 54 in which the DC-DC voltage converter 54 applies a voltage to the battery 56. In an exemplary embodiment, when the DC-DC voltage converter 54 has the buck operational mode, the contactor 42 has a closed operational state, the high voltage switch 200 has a closed operational state, the first and second plurality of FET switches 506, 606 are being switched as desired, and the low voltage switch 270 has a closed operational state.

The term "safe operational mode" is an operational mode of the DC-DC voltage converter 54 in which the DC-DC voltage converter 54 does not apply a voltage to the battery 56 or to the battery 40. In an exemplary embodiment, when the DC-DC voltage converter 54 has the safe operational mode, the contactor 42 has an open operational state, the high voltage switch 200 has an open operational state, the first and second plurality of FET switches 506, 606 have the open operational state, the low voltage switch 270 has the open operational state.

The term "hardware abstraction layer" is a layer of programming (e.g., low-level programs or applications) that allows an application to interact with a digital input-output device 942 and an analog-to-digital converter 946 at a general or abstract level rather than at a detailed hardware level.

The terms "inhibiting operation of a disable pin" means no allowing a voltage level of the disable pin to transition between a high logic level and a low logic level.

The term "IC" means integrated circuit.

Referring to FIG. 1, the battery 40 includes a positive terminal 100 and a negative terminal 102. In an exemplary embodiment, the battery 40 generates 48 Vdc between the positive terminal 100 and the negative terminal 102. The positive terminal 100 is electrically coupled to a first electrical node 124 on a first side of the contactor 42. The negative terminal 102 is electrically coupled to an electrical ground.

The contactor 42 has a contactor coil 120, a contact 122, a first electrical node 124 and a second electrical node 126. The first electrical node 124 is electrically coupled to the positive terminal 100 of the battery 40. The second electrical node 126 is electrically coupled to both the 3-phase capacitor bank 48 and the electrical node 340 of the high voltage switch 200 of the DC-DC voltage converter 54. When the microcontroller 800 generates first and second control signals that are received by the voltage drivers 802, 804, respectively, the contactor coil 120 is energized which transitions the contact 122 to a closed operational state. Alternately, when the microcontroller 800 generates third and fourth control signals that are received by the voltage drivers 802, 804, respectively, the contactor coil 120 is de-energized which transitions the contact 122 to an open operational state. In an exemplary embodiment, the third and fourth control signals can each be a ground voltage level.

The 3-phase capacitor bank 48 is utilized to store and release electrical energy from the battery starter-generator unit 50, the battery 40, and the DC-DC voltage converter 54. The 3-phase capacitor bank 48 is electrically coupled to the electrical node 126 of the contactor 126 and the electrical node 340 of the high voltage switch 200 of the DC-DC voltage converter 54 utilizing the electrical line 65. The 3-phase capacitor bank 48 is further electrically coupled to the battery-starter generator unit 50 utilizing the electrical lines 68, 70, 72.

The battery-starter generator unit 50 is provided to generate an AC voltage that is received by the 3-phase capacitor bank 48 via the electrical lines 68, 70, 72.

The DC-DC voltage converter 54 includes a high voltage switch 200, a DC-DC voltage converter control circuit 240, a low voltage switch 270, and electrical lines 310, 312.

The high voltage switch 200 includes a node 340 and a node 342. In an exemplary embodiment, the high voltage switch 200 is a high voltage bi-directional MOSFET switch. Of course, in an alternative embodiment, the high voltage switch 200 could be replaced with another type of switch having desired voltage and current capabilities. The node 340 of the high voltage switch 200 is electrically coupled to the electrical node 126 of the contactor 46, and the node 342 is electrically coupled to the terminal 446 of the DC-DC voltage converter control circuit 240. When the microcontroller 800 generates a control signal that is received by the high voltage switch 200 (or that is received by a controller or a microprocessor within the DC-DC voltage converter 54 that is operably coupled to the switch 200) via the electrical line 908, the microcontroller 800 induces the switch 200 to transition to a closed operational state. When the microcontroller 800 generates another control signal (e.g., ground voltage level control signal) on the electrical line 908, the microcontroller 800 induces the switch 200 to transition to an open operational state.

Figure 2:
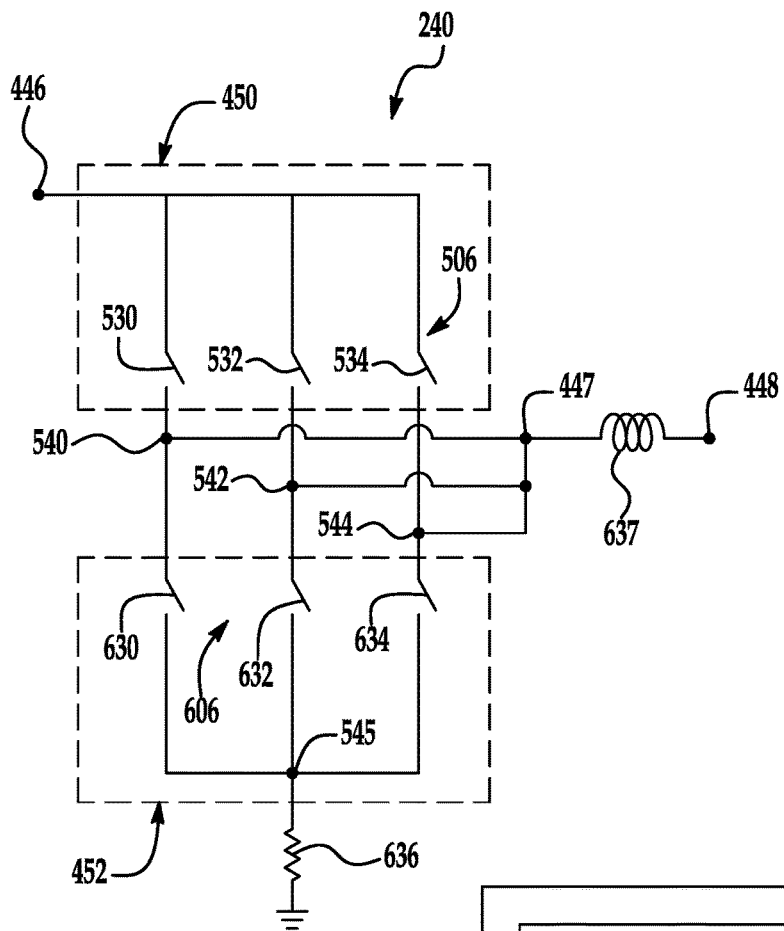
FIG. 2 is a schematic of a DC-DC voltage converter control circuit utilized in the DC-DC voltage converter of FIG. 1.

Referring to FIGS. 1 and 2, the DC-DC voltage converter control circuit 240 has a terminal 446, a terminal 448, a high side integrated circuit 450, a low side integrated circuit 452, a buck mode integrated circuit 454, nodes 540, 542, 544, 545, a resistor 636, and an inductor 637. The DC-DC voltage converter control circuit 240 can convert a DC voltage received at the terminal 446 to another DC voltage that is output at the terminal 448. Alternately, the DC-DC voltage converter control circuit 240 can convert a DC voltage received at the terminal 448 to another DC voltage that is output at the terminal 446.

The high side integrated circuit 450 includes an input pin 500, an input pin 502, an output pin 504, and a first plurality of FET switches 506 including FET switches 530, 532, 534 therein. The input pin 500 is electrically coupled to a pin 3 of the digital input-output device 942 of the microcontroller 800 utilizing an electrical line 900. The input pin 502 is electrically coupled to the pin 4 of the digital input-output device 942 of the microcontroller 800 utilizing the electrical line 902. The output pin 504 is electrically coupled to the pin 7 of the digital input-output device 942 of the microcontroller 800 utilizing an electrical line 916.

The FET switches 530, 532, 534 have operational states (e.g., closed operational state or open operational state) controlled by control voltages received by the FET switches 530, 532, 534 from the buck mode integrated circuit 454, and further controlled by control voltages at the pins 500, 502 from the microcontroller 800. In an exemplary embodiment, the FET switches 530, 532, 534 are electrically coupled at a first end to the high voltage terminal 446. The FET switch 530 is electrically coupled between the high voltage terminal 446 and the node 540, and is further electrically coupled in series with the FET switch 630 of the low side integrated circuit 452. The FET switch 532 is electrically coupled between the high voltage terminal 446 and the node 542, and is further electrically coupled in series with the FET switch 632 of the low side integrated circuit 452. The FET switch 534 is electrically coupled between the high voltage terminal 446 and the node 544, and further electrically coupled in series with the FET switch 634 of the low side integrated circuit 452.

When the high side integrated circuit 450 receives a control signal having a high logic level at the input pin 500, the high side integrated circuit 450 enables operation of the first plurality of FET switches 506. Alternately, when the high side integrated circuit 450 receives a control signal having a low logic level at the input pin 500, the high side integrated circuit 450 transitions each FET switch of the first plurality of FET switches 506 to an open operational state. Further, when the high side integrated circuit 450 receives a control signal having a low logic level at the input pin 502, the high side integrated circuit 450 transitions each FET switch of the first plurality of FET switches 506 to an open operational state. Still further, when the high side integrated circuit 450 transitions each FET switch of the first plurality of FET switches 506 to an open operational state, the output pin 504 outputs a confirmation signal indicating that each FET switch of the first plurality of FET switches 506 has an open operational state, that is received by the digital input-output device 942 of the microcontroller 800 utilizing the electrical line 916.

The low side integrated circuit 452 includes an input pin 600, an input pin 602, an output pin 604, and a second plurality of FET switches 606 including FET switches 630, 632, 634. The input pin 600 is electrically coupled to the pin 3 of the digital input-output device 942 of the microcontroller 800 utilizing an electrical line 900. The input pin 602 is electrically coupled to the pin 4 of the digital input-output device 942 of the microcontroller 800 utilizing the electrical line 902. The output pin 604 is electrically coupled to the pin 7 of the digital input-output device 942 of the microcontroller 800 utilizing an electrical line 916.

The FET switches 630, 632, 634 have operational states (e.g., closed operational state or open operational state) that are controlled by control voltages received by the FET switches 630, 632, 634 from the buck mode integrated circuit 454, and further controlled by control voltages at the pins 600, 602 from the microcontroller 800. The FET switches 630, 632, 634 are electrically coupled in series with the FET switches 530, 532, 534, respectively. The FET switches 630, 632, 634 are further electrically coupled to the resistor 636 which is further electrically coupled to electrical ground.

When the low side integrated circuit 452 receives a control signal having a high logic level at the input pin 600, the low side integrated circuit 452 enables operation of the second plurality of FET switches 606. Alternately, when the low side integrated circuit 452 receives a control signal having a low logic level at the input pin 600, the low side integrated circuit 452 transitions each FET switch of the second plurality of FET switches 606 to an open operational state. Further, when the low side integrated circuit 452 receives a control signal having a low logic level at the input pin 602, the low side integrated circuit 452 transitions each FET switch of the second plurality of FET switches 606 to an open operational state. Still further, when the low side integrated circuit 452 transitions each FET switch of the second plurality of FET switches 606 to an open operational state, the output pin 604 outputs a confirmation signal indicating that each FET switch of the second plurality of FET switches 606 has an open operational state, that is received by the digital input-output device 942 of the microcontroller 800 utilizing the electrical line 916.

The inductor 637 is electrically coupled between the node 447 and the electrical terminal 448. The nodes 540, 542, 544 are electrically coupled to the node 447.

Referring to FIG. 1, the low voltage switch 270 has a node 760 that is electrically coupled to the terminal 448 of the DC-DC voltage converter control circuit 240, and a node 762 that is electrically coupled to the positive terminal 780 of the battery 56. When the microcontroller 800 generates a control signal that is received by the low voltage switch 270 (or that is received by a controller or a microprocessor within the DC-DC voltage converter 54 that is operably coupled to the switch 270) via the electrical line 904, the microcontroller 800 induces the switch 270 to transition to a closed operational state. When the microcontroller 800 generates another control signal (e.g., ground voltage level control signal) on the electrical line 904, the microcontroller 800 induces the switch 270 to transition to an open operational state. In an exemplary embodiment, the low voltage switch 270 is a bi-directional MOSFET switch.

The battery 56 includes a positive terminal 780 and a negative terminal 782. In an exemplary embodiment, the battery 56 generates 12 Vdc between the positive terminal 780 and the negative terminal 782. The positive terminal 780 is electrically coupled to the electrical node 762 of the low voltage switch 270. The negative terminal 782 is electrically coupled to an electrical ground, which may be different that the electrical ground that the battery 40 is coupled to.

The control system 58 is utilized to transition the DC-DC voltage converter 54 from a buck operational mode to a safe operational mode. The control system 58 includes the microcontroller 800, the voltage drivers 802, 804, the watchdog IC 806, and the electrical lines 900, 902, 904, 908, 916, 918, 920, 922, 924, 928, 929, 930, 931.

Referring to FIGS. 1 and 3, the microcontroller 800 includes a microprocessor 940, the digital input-output device 942, the memory device 944, and the analog-to-digital converter 946. The microprocessor 940 is programmed to execute a first application 1100, a second application 1102, a third application 1104, a fourth application 1106, a task deadline monitoring application 1108, a program flow monitoring application 1110, and a hardware abstraction layer 1112 stored in the memory device 944 for implementing the methods described herein. The microprocessor 940 is operably coupled to the digital input-output device 942, the memory device 944, and the analog-to-digital converter 946. The memory device 944 stores data and software applications for implementing the methods described therein.

The digital input-output device 942 includes pins 1, 2, 3, 4, 5, 6, 7, 8, 9.

The pin 1 of the digital input-output device 942 is electrically coupled to the voltage driver 802 via an electrical line 918. When the pin 1 has a high logic level, the voltage driver 802 is enabled for operation. Alternately, when the pin 1 has a low logic level, the voltage driver 802 is disabled from operation.

The pin 2 of the digital input-output device 942 is electrically coupled to the voltage driver 804. When the pin 2 has a high logic level, the voltage driver 804 is enabled for operation. Alternately, when the pin 2 has a low logic level, the voltage driver 804 is disabled from operation.

The pin 3 of the digital input-output device 942 is electrically coupled to the input pin 500 of the high side integrated circuit 450 and the input pin 600 of the low side integrated circuit 452 of the DC-DC voltage converter 54. When the pin 3 has a high logic level, the high side integrated circuit 450 and the low side integrated circuit 452 are enabled for operation. Alternately, when the pin 3 has a low logic level, the high side integrated circuit 450 and the low side integrated circuit 452 are disabled from operation.

The pin 4 of the digital input-output device 942 is electrically coupled to the input pin 502 of the high side integrated circuit 450 and the input pin 602 of the low side integrated circuit 452 of the DC-DC voltage converter 54. When the pin 4 has a high logic level, the high side integrated circuit 450 and the low side integrated circuit 452 are enabled for operation. Alternately, when the pin 3 has a low logic level, the high side integrated circuit 450 and the low side integrated circuit 452 are disabled from operation.

The pin 5 of the digital input-output device 942 is electrically coupled to the low voltage switch 270. When the pin 5 has a high logic level, the low voltage switch 270 is transitioned to a closed operational state. Alternately, when the pin 3 has a low logic level, the low voltage switch 270 is transitioned to an open operational state.

The pin 6 of the digital input-output device 942 is electrically coupled to the high voltage switch 200. When the pin 6 has a high logic level, the high voltage switch 200 is transitioned to a closed operational state. Alternately, when the pin 6 has a low logic level, the high voltage switch 200 is transitioned to an open operational state.

The pin 7 of the digital input-output device 942 is electrically coupled to the output pin 504 of the high side integrated circuit 450 and the output pin 604 of the low side integrated circuit 452 of the DC-DC voltage converter 54. When the pin 7 has a high logic level, at least one of the high side integrated circuit 450 and the low side integrated circuit 452 is indicating that the plurality of FET switches therein has been transitioned to an open operational state.

The pin 8 (i.e., enable pin 8) of the digital input-output device 942 is electrically coupled to the enable pin 1 of the watchdog IC 806. When the enable pin 8 is transitioned from a high logic level to a low logic level, an internal timer 807 within the watchdog IC 806 is started.

The pin 9 (i.e., disable pin 9) of the digital input-output device 942 is electrically coupled to the disable pin 2 of the watchdog IC 806. When the pin 9 is transitioned from a high logic level to a low logic level, an internal timer 807 within the watchdog IC 806 is stopped and reset.

The watchdog IC 806 includes pins 1, 2, 3, 4, 5, 6. The watchdog IC 806 is provided to transition the DC-DC voltage converter 54 to a safe operational mode if a task deadline error is detected or a program flow error is detected.

As discussed above, the pin 1 (i.e., enable pin 1) of the watchdog IC 806 is electrically coupled to the pin 8 (i.e., enable pin 8) of the digital input-output device 942. When the pin 1 of the watchdog IC 806 is transitioned from a high logic level to a low logic level, the internal timer 807 starts to increment.

The pin 2 (i.e., disable pin 2) of the watchdog IC 806 is electrically coupled to the pin 9 (i.e., disable pin 9) of the digital input-output device 942. When the pin 2 of the watchdog IC 806 is transitioned from a high logic level to a low logic level, the internal timer 807 is stopped and reset.

The pin 3 (i.e., control pin 3) of the watchdog IC 806 is electrically coupled to the input pin 503 of the high side integrated circuit 450 and the input pin 603 of the low side integrated circuit 452 of the DC-DC voltage converter 54. When the pin 3 of the watchdog IC 806 has a high logic level, the high side integrated circuit 450 and the low side integrated circuit 452 are enabled for operation. Alternately, when the pin 3 of the watchdog IC 806 has a low logic level, the high side integrated circuit 450 and the low side integrated circuit 452 are disabled from operation.

The pin 4 (i.e., control pin 4) of the watchdog IC 806 is electrically coupled to the low voltage switch 270. When the pin 4 of the watchdog IC 806 has a high logic level, the low voltage switch 270 transitions to a closed operational state. Alternately, when the pin 4 of the watchdog IC 806 has a low logic level, the low voltage switch 270 transitions to an open operational state.

The pin 5 (i.e., control pin 5) of the watchdog IC 806 is electrically coupled to the high voltage switch 200. When the pin 5 of the watchdog IC 806 has a high logic level, the high voltage switch 200 transitions to a closed operational state. Alternately, when the pin 5 of the watchdog IC 806 has a low logic level, the high voltage switch 200 transitions to an open operational state.

The pin 6 (i.e., control pin 6) of the watchdog IC 806 is electrically coupled to the high voltage driver 802. When the pin 6 of the watchdog IC 806 has a high logic level, the high voltage driver 802 is enabled for operation. Alternately, when the pin 6 of the watchdog IC 806 has a low logic level, the high voltage driver 802 is disabled from operation which opens the contact 122.

During operation, when the internal timer 807 has a count exceeding a predetermined count (e.g., time) indicating a task deadline fault, the watchdog IC 806 transitions the control pins 3, 4, 5, 6 to a low logic level to transition the DC-DC voltage converter to a safe operational mode.

Referring to FIGS. 1 and 3-5, a flowchart of a method for inducing the DC-DC voltage converter 54 to transition from the buck operational mode to the safe operational mode in accordance with an exemplary embodiment is described. The DC-DC voltage converter 54 is in a buck operational mode prior to performing the following steps.

At step 1200, the microcontroller 54 performs a first scheduled task including the execution of first, second, third and fourth applications 1100, 1102, 1104, 1106. After step 1200, the method advances to step 1202.

At step 1202, the first application 1100 sends a first command value to a hardware abstraction layer 1112. After step 1202, the method advances to step 1204.

At step 1204, the hardware abstraction layer 1112 commands a digital input-output device 942 to generate a first control signal that is received at a first input pin (e.g., input pin 500) of a high side integrated circuit 450 and a first input pin (e.g., input pin 600) of a low side integrated circuit 452 in a DC-DC voltage converter 54 to transition first and second plurality of FET switches 506, 606 to an open operational state, when the first command value is equal to a first predetermined command value. After step 1204, the method advances to step 1206.

At step 1206, the second application 1102 sends a second command value to the hardware abstraction layer 1112. After step 1206, the method advances to step 1208.

At step 1208, the hardware abstraction layer 1112 commands the digital input-output device 942 to generate a second control signal, that is received at a second input pin (e.g., input pin 502) of the high side integrated circuit 450 and a second input pin (e.g., input pin 602) of the low side integrated circuit 452 in the DC-DC voltage converter 54 to transition the first and second plurality of FET switches 506, 606 to the open operational state, when the second command value is equal to a second predetermined command value. After step 1208, the method advances to step 1210.

At step 1210, the third application 1104 receives a first confirmation value from the hardware abstraction layer 1112 indicating that at least one of the first plurality of FET switches 506 and the second plurality of FET switches 606 are transitioned to the open operational state. After step 1210, the method advances to step 1220.

At step 1220, the fourth application 1106 receives a second confirmation value from the hardware abstraction layer 1112 indicating that at least one of the first plurality of FET switches 506 and the second plurality of FET switches 606 are transitioned to the open operational state. After step 1220, the method advances to step 1222.

At step 1222, the task deadline monitoring application 1108 sets a task deadline flag to a first fault value when a time interval associated with performing the first scheduled task is greater than a threshold time interval. After step 1222, the method advances to step 1224.

At step 1224, the hardware abstraction layer 1112 inhibits operation of a disable pin 9 in the digital input-output device 942 to further inhibit operation of a disable pin 2 on a watchdog IC 806 when the task deadline flag is equal to the first fault value, such that an internal timer 807 in the watchdog IC 806 continues to increment past a predetermined time which induces the watchdog IC 806 to generate a third control signal to transition the first and second plurality of FET switches 506, 606 to the open operational state, a fourth control signal to transition a high voltage switch 200 to the open operational state, a fifth control signal to transition a low voltage switch 270 to the open operational state, and a sixth control signal to transition a contactor 42 to the open operational state. After step 1224, the method is exited.

Referring to FIGS. 1, 3, 6 and 7, a flowchart of a method for inducing the DC-DC voltage converter 54 to transition from the buck operational mode to a safe operational mode in accordance with another exemplary embodiment is described. The DC-DC voltage converter 54 is in a buck operational mode prior to performing the following steps. It is further noted that only the functionality of the first, second, third, and fourth applications relating to program flow monitoring is described in the following steps.

At step 1300, the first application 1100 sends a first command value to the hardware abstraction layer 1112, and sends a first sequence value to a second application 1102. After step 1300, the method advances to the step 1302.

At step 1302, the hardware abstraction layer 1112 commands a digital input-output device 942 to generate a first control signal that is received at a first input pin (e.g., input pin 500) of the high side integrated circuit 450 and a first input pin (e.g., input pin 600) of the low side integrated circuit 452 in the DC-DC voltage converter 54 to transition first and second plurality of FET switches 506, 606 to the open operational state, when the first command value is equal to a first predetermined command value. After step 1302, the method advances the step 1304.

At step 1304, the second application 1102 sends a second command value to the hardware abstraction layer 1112. The second application 1102 determines a second sequence value based on the first sequence value, and sends the second sequence value to the third application 1104. After step 1304, the method advances to step 1306.

At step 1306, the hardware abstraction layer 1112 commands the digital input-output device 942 to generate a second control signal, that is received at a second input pin (e.g., input pin 502) of the high side integrated circuit 450 and a second input pin (e.g., input pin 602) of the low side integrated circuit 452 in the DC-DC voltage converter 54 to transition the first and second plurality of FET switches 506, 606 to the open operational state, when the second command value is equal to a second predetermined command value. After step 1306, the method advances to step 1308.

At step 1308, the third application 1104 receives a first confirmation value from the hardware abstraction layer 1112 indicating that at least one of the first plurality of FET switches 506 and the second plurality of FET switches 606 are transitioned to the open operational state. Further, the third application 1104 determines a third sequence value based on the second sequence value, and sends the third sequence value to a fourth application 1106. After step 1308, the method advances to step 1320.

At step 1320, the fourth application 1106 receives a second confirmation value from the hardware abstraction layer 1112 indicating that at least one of the first plurality of FET switches 506 and the second plurality of FET switches 606 are transitioned to the open operational state. Further, the fourth application 1106 determines a fourth sequence value based on the third sequence value, and sends the fourth sequence value to a program flow monitoring application 1110. After step 1320, the method advances to step 1322.

At step 1322, the program flow monitoring application 1110 sets a flow sequence error flag to a first fault value, when a fifth sequence value based on the fourth sequence value is not equal to a predetermined sequence value indicating a flow sequence error condition. After step 1322, the method advances to step 1324.

At step 1324, the hardware abstraction layer 1112 inhibits operation of a disable pin (e.g., pin 9) in the digital input-output device 942 to further inhibit operation of a disable pin (e.g., pin 2) on the watchdog IC 806 when the task deadline flag is equal to the first fault value, such that an internal timer 807 in the watchdog IC 806 continues to increment past a predetermined time which induces the watchdog IC 806 to generate a third control signal to transition the first and second plurality of FET switches 506, 606 to the open operational state, a fourth control signal to transition a high voltage switch 200 to the open operational state, a fifth control signal to transition a low voltage switch 270 to the open operational state, and a sixth control signal to transition a contactor 42 to the open operational state. After step 1324, the method is exited.

The control system for transitioning a DC-DC voltage converter from a buck operational mode to a safe operational mode provides a substantial advantage over other control systems. In particular, the control system has a technical effect of utilizing a task deadline monitoring application that determines when a time interval associated with performing a scheduled task is greater than a threshold time interval indicating a fault condition, and if so the control system induces a watchdog IC to transition the DC-DC voltage converter to the safe operational mode. Further, the control system utilizes a program flow monitoring application that determines when a flow sequence error condition occurs during execution of at least first and second applications, and if so the control system induces the watchdog IC to transition the DC-DC voltage converter to the safe operational mode.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A control system for transitioning a DC-DC voltage converter from a buck operational mode to a safe operational mode; the DC-DC voltage converter having a high side integrated circuit having a first plurality of FET switches, and a low side integrated circuit having a second plurality of FET switches therein, comprising:
a watchdog IC having a first disable pin and an internal timer;

a microcontroller having a digital input-output device with a second disable pin electrically coupled to the first disable pin; the microprocessor further having first and second applications, a task deadline monitoring application, and a hardware abstraction layer;

the microcontroller performing a first scheduled task including the execution of the first and second applications;

the task deadline monitoring application setting a task deadline flag to a first fault value when a time interval associated with performing the first scheduled task is greater than a threshold time interval; and the hardware abstraction layer inhibiting operation of the second disable pin when the task deadline flag is equal to the first fault value, such that the internal timer continues to increment past a predetermined time which induces the watchdog IC to transition the DC-DC voltage converter to the safe operational mode.

2. The control system of claim 1, wherein:
the watchdog IC transitions the DC-DC voltage converter to the safe operational mode by generating a first control signal to transition the first and second plurality of FET switches to the open operational state, a second control signal to transition a high voltage switch in the DC-DC voltage converter to the open operational state, a third control signal to transition a low voltage switch in the DC-DC voltage converter to the open operational state, and a fourth control signal to transition a contactor to the open operational state.

3. The control system of claim 1, wherein:
the microcontroller further includes third and fourth applications, the third application receiving a first confirmation value from the hardware abstraction layer indicating that at least one of the first plurality of FET switches and the second plurality of FET switches are transitioned to the open operational state.

4. The control system of claim 3, wherein:
the fourth application receiving a second confirmation value from the hardware abstraction layer indicating that at least one of the first plurality of FET switches and the second plurality of FET switches are transitioned to the open operational state.

5. The control system of claim 1, wherein the first scheduled task including the execution of third and fourth applications.

6. The control system of claim 1, wherein:
the first application sending a first command value to the hardware abstraction layer to transition the first and second plurality of FET switches to an open operational state; and the second application sending a second command value to the hardware abstraction layer to transition the first and second plurality of FET switches to the open operational state.

7. The control system of claim 6, wherein:
the hardware abstraction layer commanding the digital input-output device to generate a first control signal that is received at a first input pin of the high side integrated circuit and a first input pin of the low side integrated circuit to transition the first and second plurality of FET switches to the open operational state, when the first command value is equal to a third command value.

8. The control system of claim 7, wherein:
the hardware abstraction layer commanding the digital input-output device to generate a second control signal that is received at a second input pin of the high side integrated circuit and a second input pin of the low side integrated circuit to transition the first and second plurality of FET switches to the open operational state, when the second command value is equal to a fourth command value.

9. A control system for transitioning a DC-DC voltage converter from a buck operational mode to a safe operational mode; the DC-DC voltage converter having a high side integrated circuit having a first plurality of FET switches, and a low side integrated circuit having a second plurality of FET switches therein, comprising:

a watchdog IC having a first disable pin and an internal timer;

a microcontroller having a digital input-output device with a second disable pin electrically coupled to the first disable pin; the microprocessor further having first and second applications, a program flow monitoring application, and a hardware abstraction layer;

the first application sending a first sequence value to the second application;

the second application determining a second sequence value based on the first sequence value;

the program flow monitoring application setting a flow sequence error flag to a first fault value when a third sequence value based on the second sequence value is not equal to a predetermined sequence value indicating a flow sequence error condition; and the hardware abstraction layer inhibiting operation of the second disable pin when the flow sequence error flag is equal to the first fault value, such that the internal timer continues to increment past a predetermined time which induces the watchdog IC to transition the DC-DC voltage converter to the safe operational mode.

10. The control system of claim 9, wherein the watchdog IC transitions the DC-DC voltage converter to the safe operational mode by generating a first control signal to transition the first and second plurality of FET switches to the open operational state, a second control signal to transition a high voltage switch in the DC-DC voltage converter to the open operational state, a third control signal to transition a low voltage switch in the DC-DC voltage converter to the open operational state, and a fourth control signal to transition a contactor to the open operational state.

11. The control system of claim 9, wherein:
the microcontroller further includes third and fourth applications, the third application receiving a first confirmation value from the hardware abstraction layer indicating that at least one of the first plurality of FET switches and the second plurality of FET switches are transitioned to the open operational state; the third application determining a fourth sequence value based on the second sequence value, and sending the fourth sequence value to the fourth application.

12. The control system of claim 11, wherein:
the fourth application receiving a second confirmation value from the hardware abstraction layer indicating that at least one of the first plurality of FET switches and the second plurality of FET switches are transitioned to the open operational state; the fourth application determining the third sequence value based on the fourth sequence value.

13. The control system of claim 9, wherein:
the first application sending a first command value to the hardware abstraction layer to transition the first and second plurality of FET switches to an open operational state; and the second application sending a second command value to the hardware abstraction layer to transition the first and second plurality of FET switches to the open operational state.

14. The control system of claim 13, wherein:
the hardware abstraction layer commanding the digital input-output device to generate a first control signal that is received at a first input pin of the high side integrated circuit and a first input pin of the low side integrated circuit to transition the first and second plurality of FET switches to the open operational state, when the first command value is equal to a third command value.

15. The control system of claim 14, wherein:
the hardware abstraction layer commanding the digital input-output device to generate a second control signal that is received at a second input pin of the high side integrated circuit and a second input pin of the low side integrated circuit to transition the first and second plurality of FET switches to the open operational state, when the second command value is equal to a fourth command value.

* * * * *